United States Patent [19]
Goodwin, III et al.

[11] Patent Number: 5,987,427
[45] Date of Patent: Nov. 16, 1999

[54] ELECTRONIC PRICE LABEL SYSTEM INCLUDING GROUPS OF ELECTRONIC PRICE LABELS AND METHOD OF MANAGING THE GROUPS

[75] Inventors: John C. Goodwin, III, Suwanee; Robert M. Berman, Lawrenceville, both of Ga.

[73] Assignee: NCR Corporation, Dayton, Ohio

[21] Appl. No.: 08/960,665

[22] Filed: Oct. 30, 1997

[51] Int. Cl.$^6$ ..................................................... G06F 17/60
[52] U.S. Cl. ................................ 705/21; 705/20; 705/16; 705/23
[58] Field of Search .................................. 705/21, 20, 16, 705/26, 27, 416; 235/383; 340/825.3, 825.35; 345/30

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,153,585 | 10/1992 | Negishi et al. | 340/870.28 |
| 5,172,314 | 12/1992 | Poland et al. | 364/401 |
| 5,299,117 | 3/1994 | Farnbach | 364/405 |
| 5,348,485 | 9/1994 | Briechle et al. | 439/110 |
| 5,448,226 | 9/1995 | Failing, Jr. et al. | 340/825.35 |
| 5,461,561 | 10/1995 | Ackerman et al. | 364/401 |
| 5,847,378 | 12/1998 | Goodwin, III | 235/383 |
| 5,854,476 | 12/1998 | Goodwin, III | 235/383 |

*Primary Examiner*—Allen R. MacDonald
*Assistant Examiner*—John Campa
*Attorney, Agent, or Firm*—Paul W. Martin; Peter H. Priest

[57] ABSTRACT

An electronic price label (EPL) system including groups of electronic price labels and method of managing the groups which facilitate group definition, assignment of EPLs to groups, assignment of items to EPLs, and assignment of prices to items. The system includes a plurality of EPLs arranged in rows and columns within a sign to define a group. At least one of the rows includes a plurality of EPLs and at least one of the columns includes a plurality of EPLs. A computer coupled to the EPLs defines the group, assigns the EPLs to the group, and assigns item identification numbers and prices to the EPLs. A storage medium stores group definition information, EPL assignments to the group, and item assignments to the EPLs. The storage medium additionally stores a price identifier, which may be incorporated into the item identification numbers.

17 Claims, 11 Drawing Sheets

PLU DATA FILE

| ITEM ID | PRICE 1 | PRICE 2 | PRICE 3 |
|---------|---------|---------|---------|
| - - - - | - - - - | - - - - | - - - - |
| - - - - | - - - - | - - - - | - - - - |
| - - - - | - - - - | - - - - | - - - - |
| - - - - | - - - - | - - - - | - - - - |
| - - - - | - - - - | - - - - | - - - - |
| - - - - | - - - - | - - - - | - - - - |

FIG. 3A

EPL DATA FILE

| EPL ID | ITEM ID | EPL CHECK |
|--------|---------|-----------|
| - - - - | - - - - | - - - - |
| - - - - | - - - - | - - - - |
| - - - - | - - - - | - - - - |
| - - - - | - - - - | - - - - |
| - - - - | - - - - | - - - - |
| - - - - | - - - - | - - - - |

FIG. 3B

EPL DATA FILE

| EPL ID | ITEM ID | EPL CHECK | PRICE |
|--------|---------|-----------|-------|
| - - - - | - - - - | - - - - | - - - - |
| - - - - | - - - - | - - - - | - - - - |
| - - - - | - - - - | - - - - | - - - - |
| - - - - | - - - - | - - - - | - - - - |
| - - - - | - - - - | - - - - | - - - - |
| - - - - | - - - - | - - - - | - - - - |

FIG. 4

GROUP DEFINITION FILE

| GROUP # | EPL'S | EPL'S/LINE |
|---|---|---|
| - - - - | - - - - | - - - - |
| - - - - | - - - - | - - - - |
| - - - - | - - - - | - - - - |
| - - - - | - - - - | - - - - |
| - - - - | - - - - | - - - - |
| - - - - | - - - - | - - - - |

FIG. 5

EPL ASSIGNMENT FILE

| GROUP # | EPL # | EPL ID |
|---|---|---|
| - - - - | - - - - | - - - - |
| - - - - | - - - - | - - - - |
| - - - - | - - - - | - - - - |
| - - - - | - - - - | - - - - |
| - - - - | - - - - | - - - - |
| - - - - | - - - - | - - - - |

ELECTRONIC PRICE LABEL SYSTEM INCLUDING GROUPS OF ELECTRONIC PRICE LABELS AND METHOD OF MANAGING THE GROUPS

CROSS-REFERENCE TO RELATED APPLICATIONS

The present invention is related to the following commonly assigned and co-pending U.S. applications:

Ser. No. 08/960,666, entitled, "Electronic Price Label System Including Groups Of Electronic Price Labels And Method Of Managing The Groups", filed Oct. 30, 1997, and invented by Goodwin et al.;

Ser. No. 08/960,401, entitled, "Apparatus For Grouping Electronic Price Labels", filed Oct. 30, 1997, and invented by Forsythe et al.; and Ser. No. 08/961,514, entitled, "Apparatus For Grouping Electronic Price Labels", filed Oct, 30, 1997, and invented by Forsythe et al.

BACKGROUND OF THE INVENTION

The present invention relates to electronic price label (EPL) systems used in transaction establishments, and more specifically to an electronic price label system including groups of electronic price labels and a method of managing the groups.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer.

Current shelf mounting arrangements for EPLs work well in a typical store environment. However, they are not well-suited for displaying price information on a family of products or a plurality of styles associated with a single product. They are also not well-suited for promoting items located on end-aisle and other promotional structures besides standard shelving. Mass merchants, including department store retailers desire more flexibility in mounting EPLs to better promote their products.

Therefore, it would be desirable to group EPLs in containers, such as cassettes. It would also be desirable to provide a method of managing the groups.

SUMMARY OF THE INVENTION

In accordance with the teachings of the present invention, an electronic price label system including groups of electronic price labels and a method of managing the groups is provided.

An electronic price label system including groups of electronic price labels and method of managing the groups which facilitate group definition, assignment of EPLs to groups, assignment of items to EPLs, and assignment of prices to items. The system includes a plurality of EPLs arranged in rows and columns within a sign to define a group. At least one of the rows includes a plurality of EPLs and at least one of the columns includes a plurality of EPLs. A computer coupled to the EPLs defines the group, assigns the EPLs to the group, and assigns item identification numbers and prices to the EPLs. A storage medium stores group definition information, EPL assignments to the group, and item assignments to the EPLs. The storage medium additionally stores a price identifier, which may be add to the item identification numbers to form modified item identification numbers.

It is a feature of the present invention that a plurality of prices can be displayed for a plurality of related items. Thus, the groups are particularly suited for use in promotional signs.

It is also a feature of the present invention that group definition, assignment of EPLs to groups, assignment of items to groups, and assignment of prices to items may be easily accomplished.

It is accordingly an object of the present invention to provide an electronic price label system including groups of electronic price labels and method of managing the groups.

It is another object of the present invention to provide an apparatus for facilitating use of EPLs in promoting items that are not located on standard merchandise shelves.

It is another object of the present invention to provide a system and method of managing rows and columns of EPLs which display different prices for different items.

It is another object of the present invention to provide a system and method of managing rows and columns of EPLs which display different prices for different styles of a number of items.

It is another object of the present invention to provide a system and method of managing rows and columns of EPLs which display regular and special prices for different items.

It is another object of the present invention to provide an apparatus for grouping electronic price labels (EPLs).

It is another object of the present invention to provide an apparatus for grouping EPLs into rows and columns.

It is another object of the present invention to provide a sign or other promotional apparatus containing groups of EPLs arranged in rows and columns.

It is another object of the present invention to provide a sign or other promotional apparatus containing groups of EPLs for displaying different prices associated with related items.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
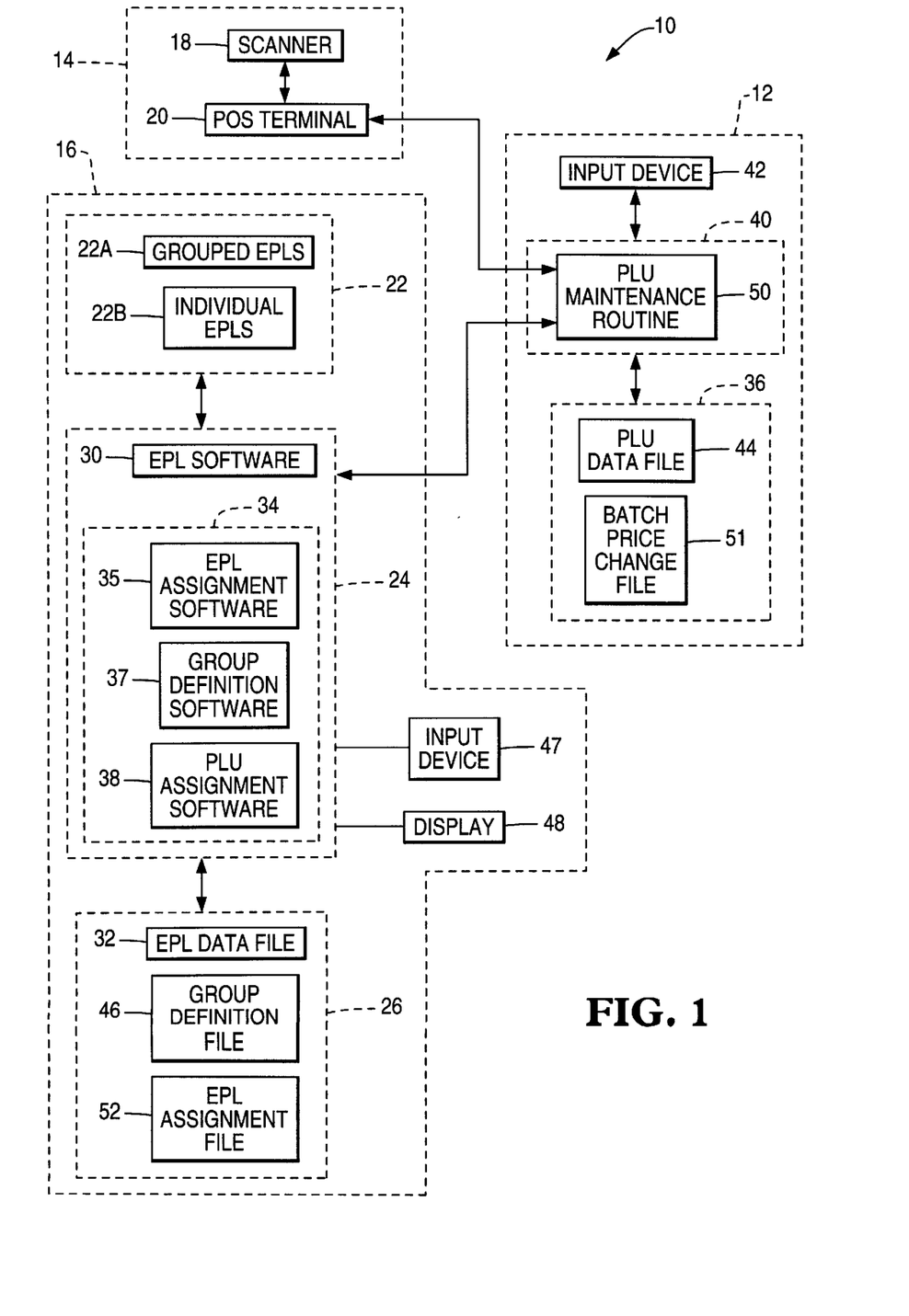
FIG. 1 is a block diagram of a transaction management system, including an EPL system.

Referring now to FIG. 1, a transaction management system 10 primarily includes host computer system 12, point-of-service (POS) system 14, and EPL system 16.

Host computer system 12 includes storage medium 36, host PLU terminal 40, and input device 42.

Storage medium 36 stores PLU data file 44. PLU data file 44 stores item prices and is available for distribution to POS terminal 20 by host PLU terminal 40. Alternatively, provision may be made for bar code scanner 18 to directly access primary PLU file 44 from host PLU terminal 40.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals.

Host PLU terminal 40 executes PLU maintenance routine 50. PLU maintenance routine 50 updates PLU data file 44.

Input device 42 is preferably a keyboard.

PLU maintenance routine 50 may send changes in price in PLU file 44 directly to EPL terminal 24 and POS terminal 20 as they are entered in input device 42 (immediate processing) or store price changes within a batch file 51 in storage medium 36 for later batch updating (batch processing).

Figure 2:
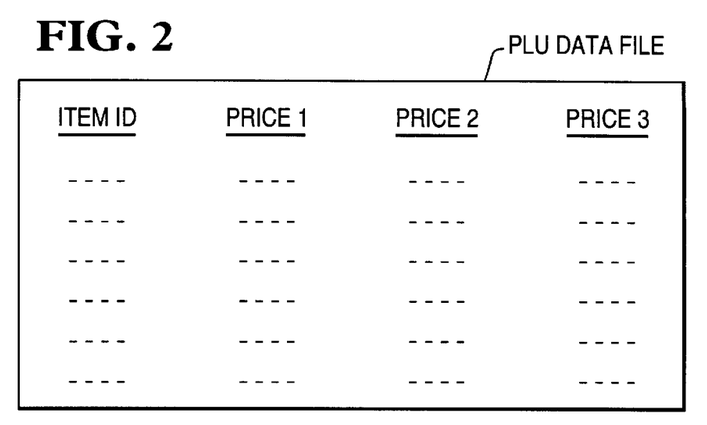
FIG. 2 is a diagram of a PLU data file.

PLU data file 44 (FIG. 2) includes a line entry for each item sold in the store. Each line entry has an item identification entry (ITEM ID), and PLU price entries (PRICE 1, PRICE 2, etc.). Entry ITEM ID identifies a store item. Entry PRICE 1 typically identifies the regular price read by POS system 14 to determine the price of an item during scanning by bar code scanner 18. When present, the additional prices (PRICE 2, PRICE 3, etc.) may include special or "sale" prices or additional version/style prices associated with an item.

POS system 14 includes bar code scanner 18 and terminal 20.

EPL system 16 primarily includes EPLs 22, host EPL terminal 24, and EPL storage medium 26.

EPLs 22 include EPLs 22A and EPLs 22B. EPLs 22B are typically attached to shelves within a store. Grouped EPLs 22A are assigned to a product having different versions or styles. Thus, each EPL 22A displays prices of different versions or special prices associated with a single product's ITEM ID. EPLs 22A may be arranged in a cassette 220 (FIG. 10B) or other suitable holder.

Host EPL terminal 24 executes EPL software 30 and group management software 34. Host EPL terminal 24 obtains price information from PLU data file 44 and sends it to EPLs 22. EPL software 30 schedules price change messages for transmission to EPLs 22 and manages communication between host EPL terminal 24 and EPLs 22.

Figure 3A:
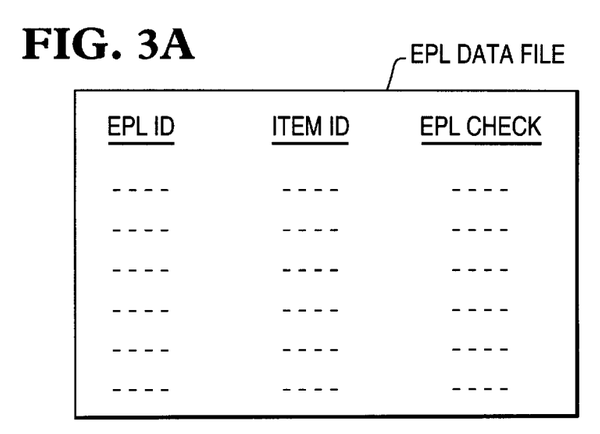
FIGS. 3A and 3B are diagrams of EPL data files.
Figure 3B:
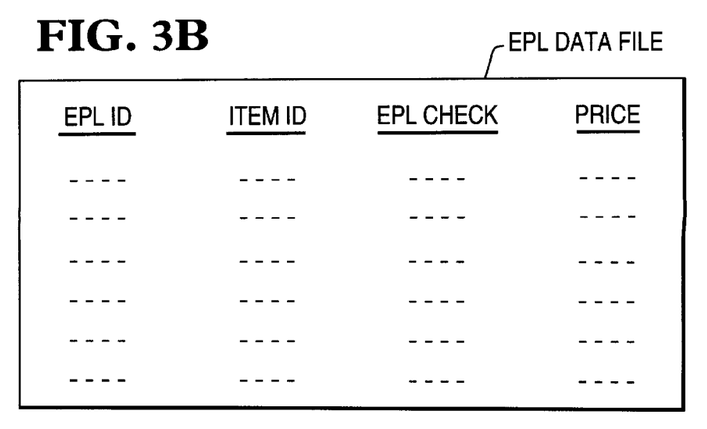

EPL software additionally maintains EPL data file 32 (FIGS. 3A and 3B). EPL data file 32 includes a line entry for each EPL 22 in EPL system 16. Each line entry has an item identification entry (ITEM ID), an EPL identification entry (EPL ID), and may additionally include an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by EPL 22.

In a first embodiment (FIG. 3A), a normally unused bit within an identification number for an item is used to identify a price for the item when a plurality of prices (PRICE 1, PRICE 2, etc.) are listed for the item in PLU data file 44. Alternatively, an additional bit may be added to the item identification numbers to identify which prices to display.

In a second embodiment (FIG. 3B), an additional entry for a price identifier (PRICE) is added to EPL data file 32 to identify a price for the item when a plurality of prices are listed for the item in PLU data file 44. The price identifier equals "1" for PRICE 1, "2" for PRICE 2, etc.

Group management software 34 manages assignment of EPLs 22A to groups and item identification numbers to EPLs 22A. For this purpose, group management software 34 includes EPL assignment software 35, group definition software 37, and PLU assignment software 38.

Figure 4:
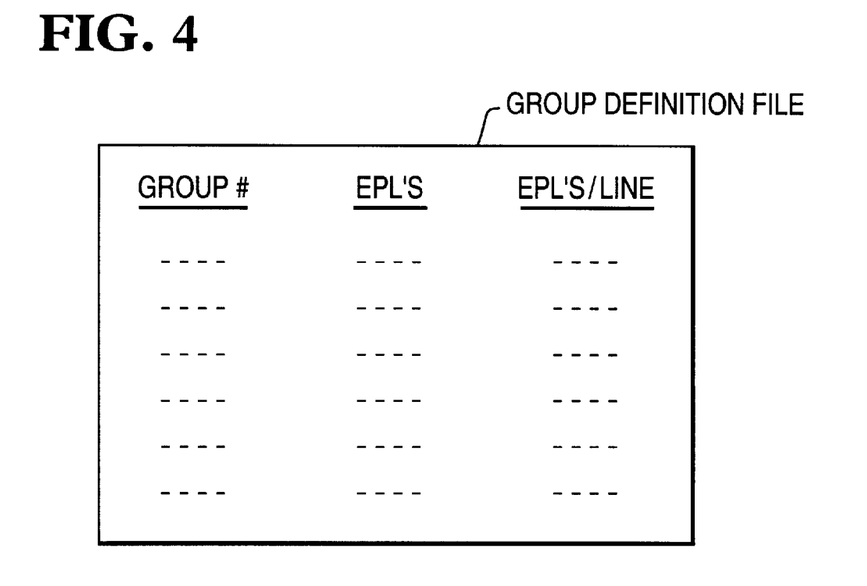
FIG. 4 is a diagram of an EPL group definition file.

Group definition software 37 stores group definition information in group definition file 46 (FIG. 4). Group definition file 46 includes line entries for group numbers (GROUP#), a total number of EPLs 22A in the group (EPLs), and the number of EPLs 22A per line (EPLs/LINE). For example, a two-by-five grouping of EPLs 22A would have two columns and five rows of EPLs 22A. The total number of EPLs 22A in the group would be ten. The number of EPLs 22A per line would two.

Figure 5:
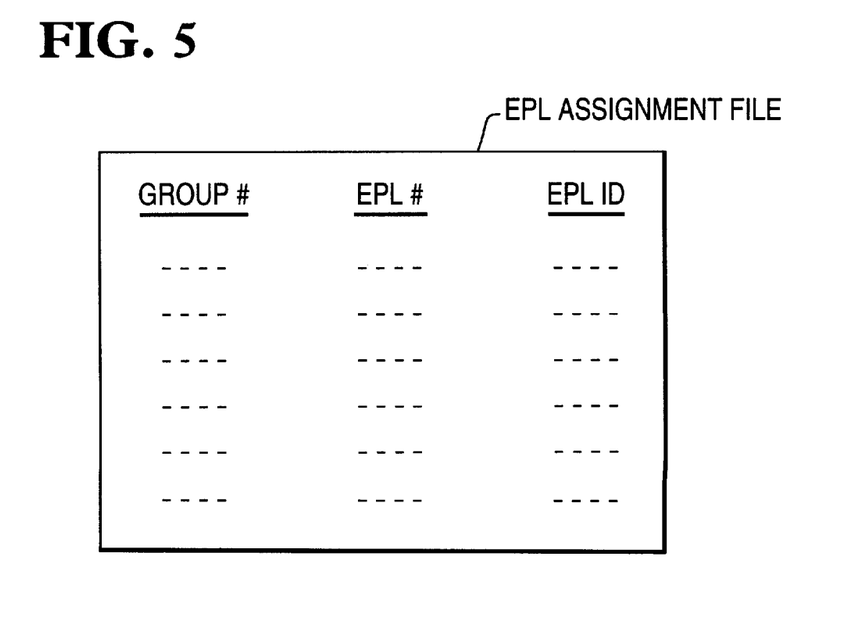
FIG. 5 is a diagram of an EPL assignment file.

EPL assignment software 35 stores EPL assignment information in EPL assignment file 52 (FIG. 5). EPL assignment file 52 includes line entries for group numbers (GROUP#), relative number of each EPL 22A within the group (EPL#), and EPL identification numbers (EPL ID). In the preceding example, relative numbers are determined from left to right and top to bottom. Thus, the two EPLs 22A in the first row would have relative EPL numbers of "1" and "2".

PLU assignment software 38 assigns item identification numbers to EPLs 22A within groups. Item assignments are stored within EPL data file 32, along with item assignments of EPLs 22B.

EPL storage medium 26 stores EPL data file 32, group definition file 46, and EPL assignment file 52, and is preferably a fixed disk drive.

EPL system 16 additionally includes input device 47 and display 48. Input device 47 records information to be stored within EPL data file 32, group definition file 46, and EPL assignment file 52. Input device 47 is preferably a keyboard.

Display 48 displays program and recorded information during execution of EPL assignment software 35, group definition software 37, and PLU assignment software 38.

Figure 6:
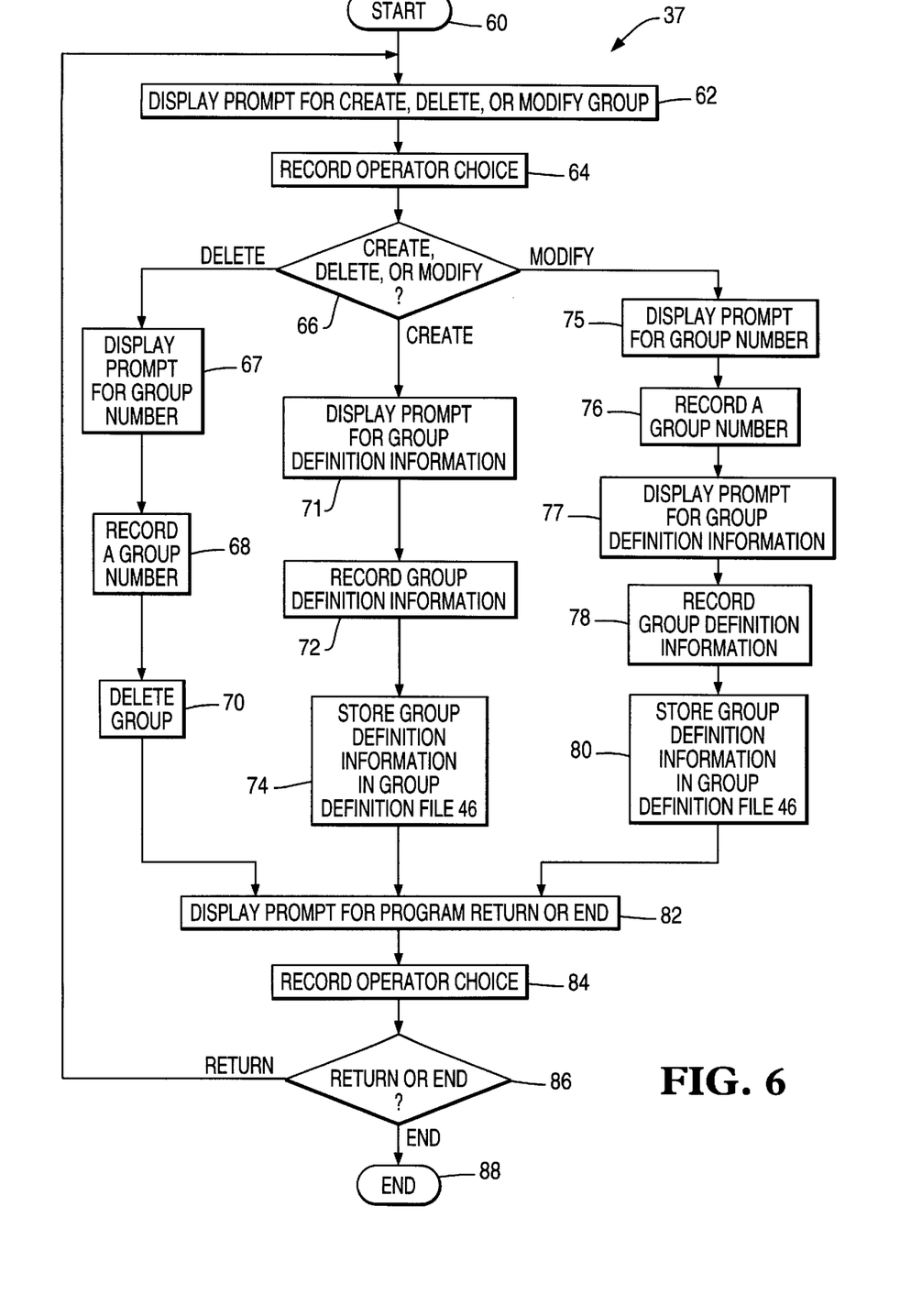
FIG. 6 is a flow diagram illustrating operation of group definition software.
Figure 7:
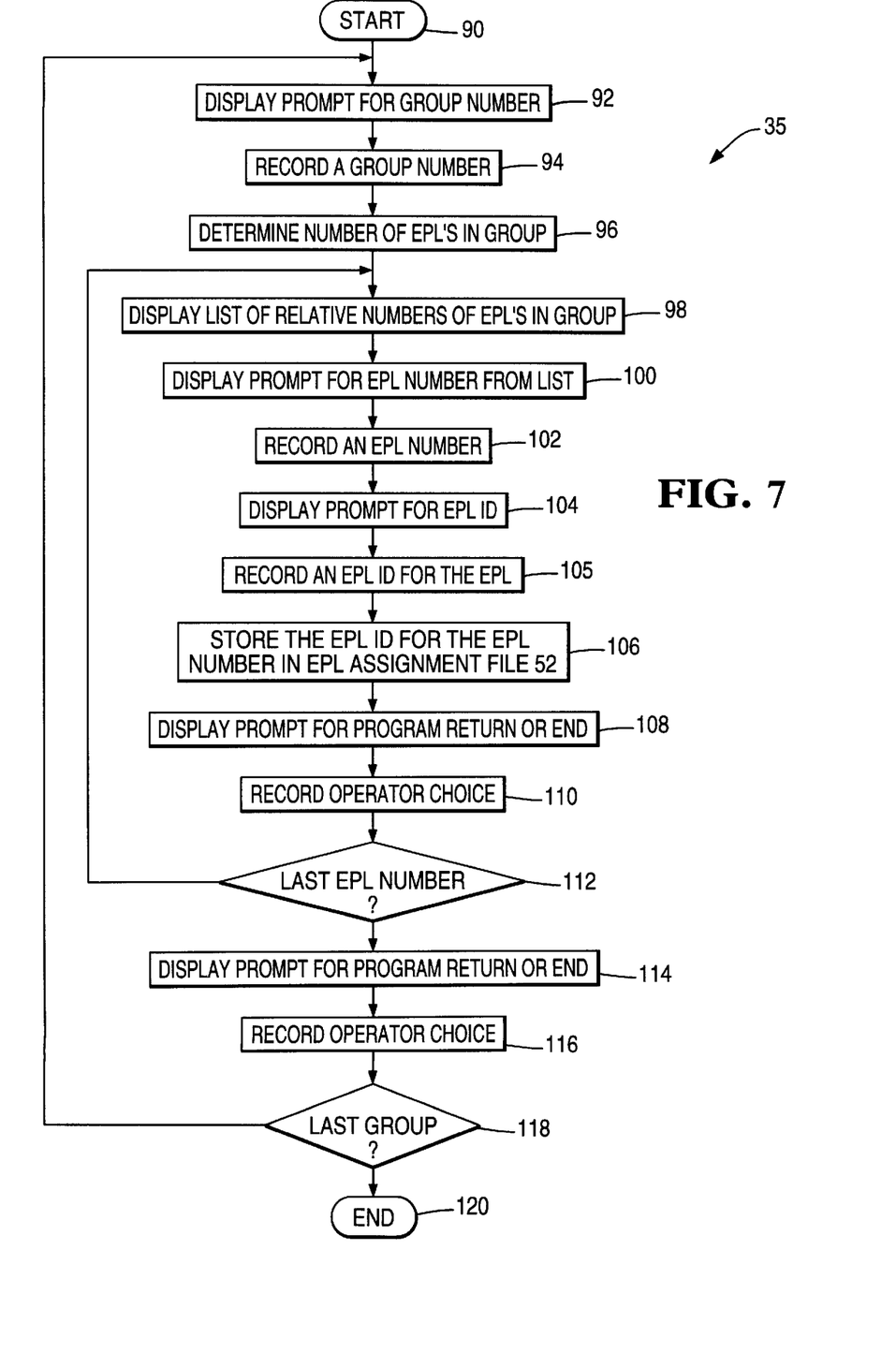
FIG. 7 is a flow diagram illustrating operation of EPL assignment software.
Figure 8A:
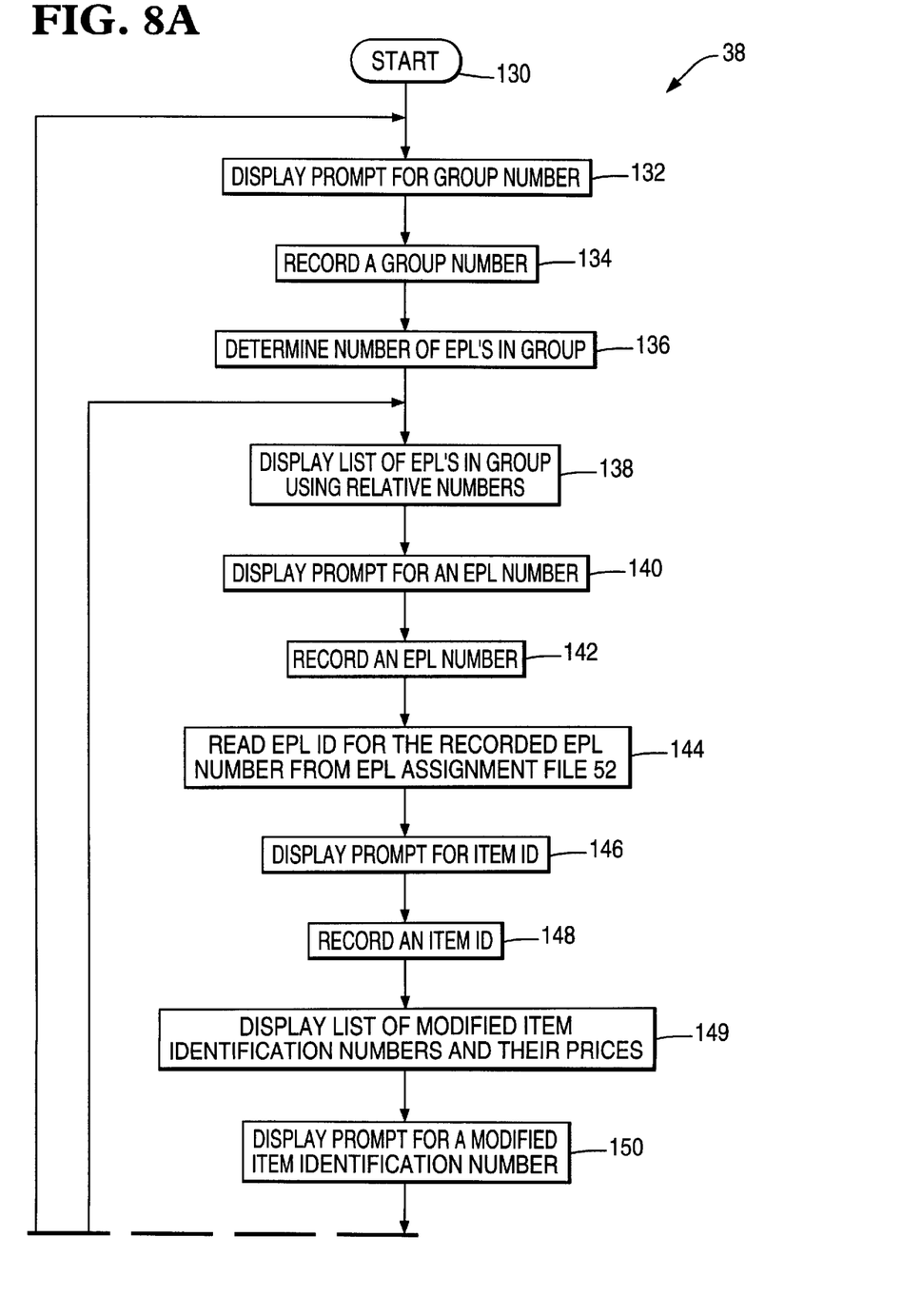
FIGS. 8A and 8B form a flow diagram illustrating operation of a first embodiment of PLU assignment software.
Figure 8B:
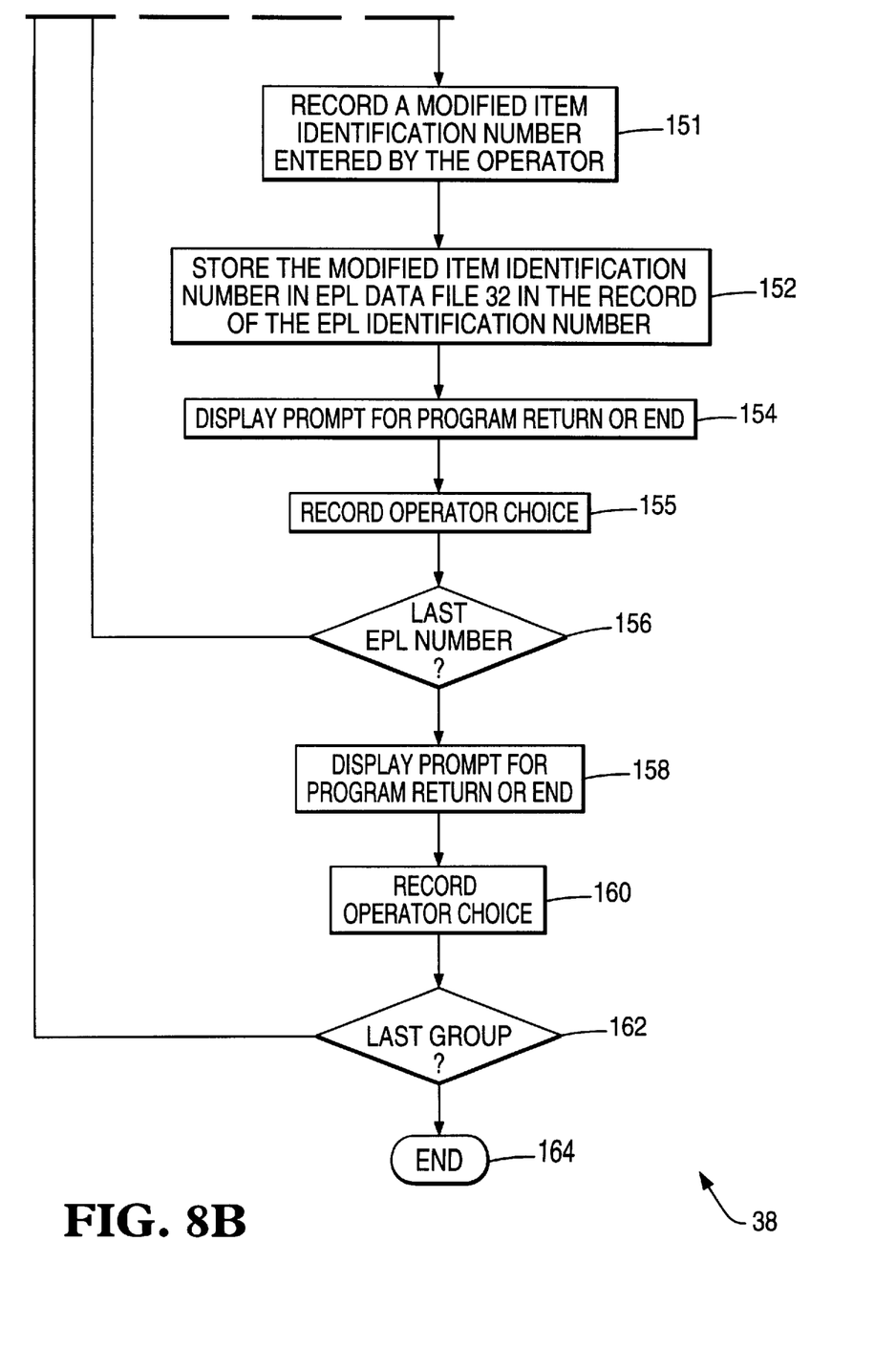

Turning now to FIGS. 6–8, the operation of group management software 34 is illustrated in more detail.

With reference to FIG. 6, operation of group definition software 37 begins with START 60.

In step 62, group definition software 37 displays a prompt for an operator to select to create, delete, or modify a group using display 48.

In step 64, group definition software 37 records the operator choice entered using input device 47.

In step 66, group definition software 37 determines from the recorded choice whether a group is to created, deleted, or modified.

For deletion, operation proceeds to step 67.

In step 67, group definition software 37 displays a prompt for a group number using display 48.

In step 68, group definition software 37 records a group number (GROUP #) entered by the operator using input device 47.

In step 70. group definition software 37 deletes group definition information for the selected group from group definition file 46.

Operation proceeds to step 82.

Returning now to step 66, for creation, operation proceeds to step 71.

In step 71, group definition software 37 displays a prompt for the operator to enter group definition information.

In step 72, group definition software 37 records a group number (GROUP #), total number of EPLs in the group (EPLs), and number of EPLs per line (EPLs/LINE) for the group entered by an operator.

In step 74, group definition software 37 stores the group definition information in group definition file 46.

Operation proceeds to step 82.

Returning now to step 66, for modification, operation proceeds to step 75.

In step 75, group definition software 37 displays a prompt for a group number (GROUP #).

In step 76, group definition software 37 records a group number entered by an operator.

In step 77, group definition software 37 displays a prompt for group definition information.

In step 78, group definition software 37 records group definition information, including total number of EPLs in the group (EPLs), and number of EPLs per line (EPLs/LINE) for the group entered by an operator.

In step 80, group definition software 37 stores the group definition information in group definition file 46.

Operation proceeds to step 82.

In step 82, group definition software 37 displays a prompt for program return to create, delete, or modify another group, or for program end.

In step 84, group definition software 37 records the operator choice entered using input device 47.

In step 86, group definition software 37 determines from the recorded choice whether to create, delete, or modify another group or end.

For return, operation returns to step 62.

For end, operation ends in step 88.

With reference to FIG. 7, operation of EPL assignment software 35 begins with START 90.

In step 92, EPL assignment software 35 displays a prompt for a group number (GROUP #) using display 48.

In step 94, EPL assignment software 35 records a group number entered by an operator using input device 47.

In step 96, EPL assignment software 35 determines the number of EPLs (EPLs) in the selected group from group definition file 46.

In step 98, EPL assignment software 35 displays the a list of relative numbers (EPL #) of all EPLs 22A in the selected group.

In step 100, EPL assignment software 35 displays a prompt for a relative EPL number from the list.

In step 102, EPL assignment software 35 records a relative EPL number entered by the operator.

In step 104, EPL assignment software 35 displays a prompt for an EPL identification number (EPL ID) to be assigned to an EPL 22A.

In step 105, EPL assignment software 35 records an EPL identification number entered by the operator.

In step 106, EPL assignment software 35 stores the EPL identification number for the EPL in EPL assignment file 52.

In step 108, EPL assignment software 35 displays a prompt for program return to assign an EPL identification number to the next EPL in the relative number list, or for operation to continue.

In step 110, EPL assignment software 35 records the operator choice entered using input device 47.

In step 112, EPL assignment software 35 determines from the recorded choice whether to return or continue.

For return, operation returns to step 98 to assign an EPL identification number to the next EPL in the relative number list. Operation returns to step 100 until the last EPL in the relative number list has been assigned an EPL identification number.

Otherwise, operation continues in step 114.

In step 114, EPL assignment software 35 displays a prompt for program return to select another group, or for program end.

In step 116, EPL assignment software 35 records the operator choice entered using input device 47.

In step 118, EPL assignment software 35 determines from the recorded choice whether to return to select another group, or to end.

For return, operation returns to step 92 to select another group.

Otherwise, operation ends at END 120.

With reference to FIGS. 8A and 8B, operation of a first embodiment of PLU assignment software 38 begins with START 130. In this embodiment, prices for different versions of the same item are identified by a special bit in the item identification number. Thus, each EPL 22A receives a unique item identification number. EPL data file 32 of FIG. 3A is employed.

In step 132, PLU assignment software 38 displays a prompt for a group number using display 48.

In step 134, PLU assignment software 38 records a group number entered by an operator using input device 47.

In step 136, PLU assignment software 38 determines the number of EPLs (EPLs) in the selected group from group definition file 46.

In step 138, PLU assignment software 38 displays a list of the determined EPLs and their relative number assignments (EPL #).

In step 140, PLU assignment software 38 displays a prompt for a relative EPL number (EPL #) within the selected group.

In step 142, PLU assignment software 38 records the relative EPL number entered by the operator.

In step 144, PLU assignment software 38 reads a corresponding EPL identification number (EPL ID) for the selected relative EPL number from EPL assignment file 52.

In step 146, PLU assignment software 38 displays a prompt for an item identification number (ITEM ID) to be assigned to the selected relative EPL number.

In step 148, PLU assignment software 38 records an item identification number entered by the operator.

In step 149, PLU assignment software 38 displays a list of modified item identification numbers and their prices. The modified item identification numbers include the item identification number and special bits to identify prices within PLU data file 44 for the same item.

In step 150, PLU assignment software 38 displays a prompt for a modified item identification number to be assigned to the selected relative EPL number.

In step 151, PLU assignment software 38 records a modified item identification number entered by the operator.

In step 152, PLU assignment software 38 stores the modified item identification number for the relative EPL number in EPL data file 32 in the record of the EPL identification number.

In step 154, PLU assignment software 38 displays a prompt for program return to assign another item to another relative EPL number, or for operation to continue.

In step 155, PLU assignment software 38 records the operator choice entered using input device 47.

In step 156, PLU assignment software 38 determines from the recorded choice whether to return or continue.

For return, operation returns to step 138 to assign another item identification number to another relative EPL number in the selected group.

Otherwise, operation continues in step 158.

In step 158, PLU assignment software 38 displays a prompt for program return to select another group, or for program end.

In step 160, PLU assignment software 38 records the operator choice entered using input device 47.

In step 162, PLU assignment software 38 determines from the recorded choice whether to return to select another group, or to end.

For return, operation returns to step 132 to select another group.

Otherwise, operation ends at END 164.

Advantageously, PLU assignment software 38 assigns merchandise items to relative EPL numbers by automatically determining the EPL identification numbers. The operator does not need to know any EPL identification numbers in order to assign items to relative EPL numbers within groups.

Figure 9:
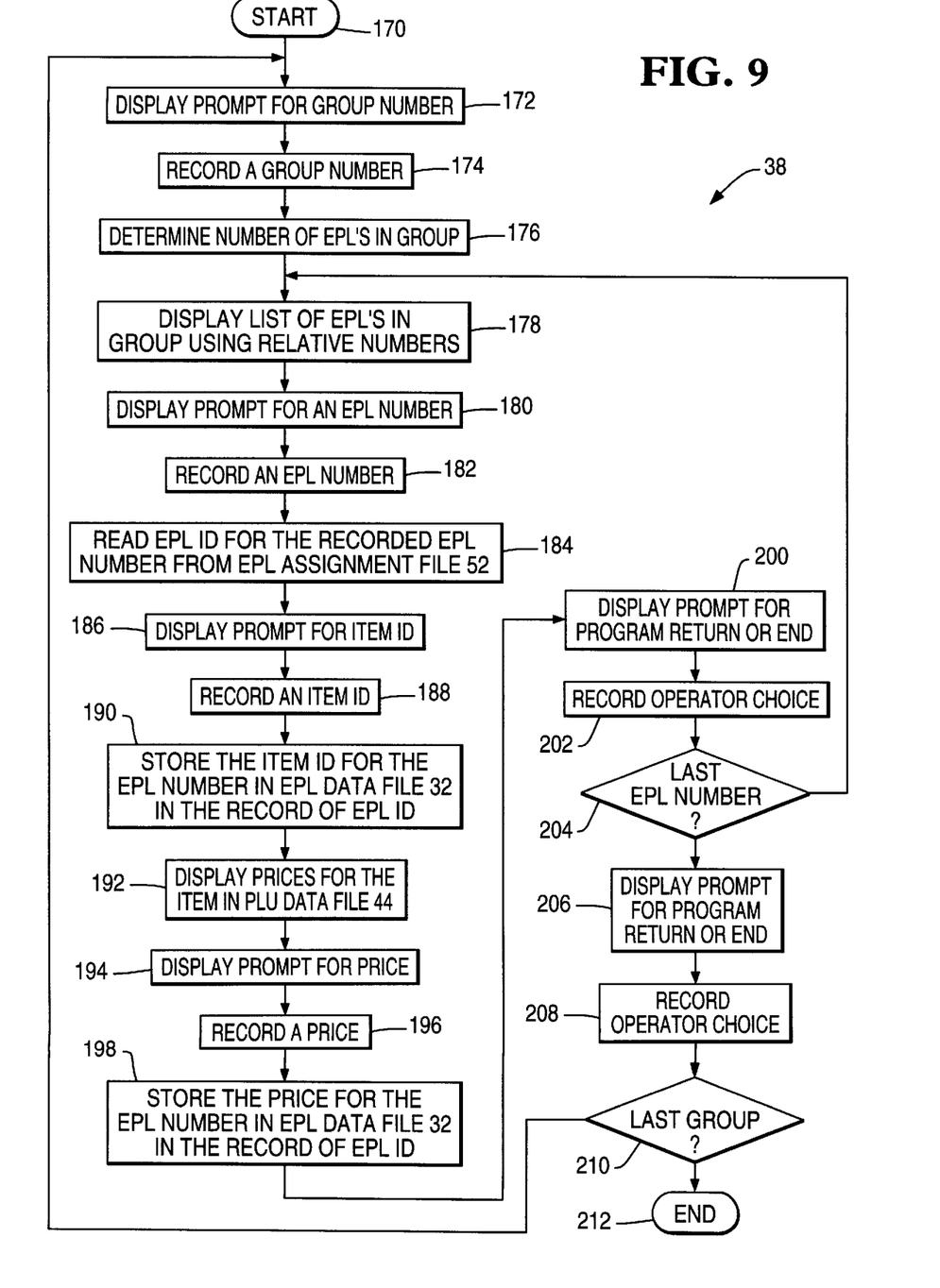
FIG. 9 is a flow diagram illustrating operation of a second embodiment of PLU assignment software.

With reference to FIG. 9, operation of a second embodiment of PLU assignment software 38 begins with START 170. In this embodiment, prices for different versions of the same item are identified by a relative price entry PRICE in EPL data file 32. Thus, each EPL 22A within a group receives the same item identification number. Prices are differentiated using the relative price entry PRICE. EPL data file 32 of FIG. 3B is employed.

In step 172, PLU assignment software 38 displays a prompt for a group number using display 48.

In step 174, PLU assignment software 38 records a group number entered by an operator using input device 47.

In step 176, PLU assignment software 38 determines the number of EPLs (EPLs) in the selected group from group definition file 46.

In step 178, PLU assignment software 38 displays a list of the determined EPLs and their relative number assignments (EPL #)

In step 180, PLU assignment software 38 displays a prompt for a relative EPL number (EPL #) within the selected group.

In step 182, PLU assignment software 38 records the relative EPL number entered by the operator.

In step 184, PLU assignment software 38 reads a corresponding EPL identification number (EPL ID) for the selected relative EPL number from EPL assignment file 52.

In step 186, PLU assignment software 38 displays a prompt for an item identification number (ITEM ID) to be assigned to the selected relative EPL number.

In step 188, PLU assignment software 38 records an item identification number entered by the operator.

In step 190, PLU assignment software 38 stores the item identification number for the relative EPL number in EPL data file 32 in the record of the EPL identification number.

In step 192, PLU assignment software 38 displays a list of prices for the item in PLU data file 44.

In step 194, PLU assignment software 38 displays a prompt for a relative price number (PRICE) to be assigned to the selected relative EPL number.

In step 196, PLU assignment software 38 records a relative price number entered by the operator.

In step 198, PLU assignment software 38 stores the relative price number for the relative EPL number in EPL data file 32 in the record of the EPL identification number.

In step 200, PLU assignment software 38 displays a prompt for program return to assign another item to another relative EPL number, or for operation to continue.

In step 202, PLU assignment software 38 records the operator choice entered using input device 47.

In step 204, PLU assignment software 38 determines from the recorded choice whether to return or continue.

For return, operation returns to step 178 to assign another item identification number to another relative EPL number in the selected group.

Otherwise, operation continues in step 206.

In step 206, PLU assignment software 38 displays a prompt for program return to select another group, or for program end.

In step 208, PLU assignment software 38 records the operator choice entered using input device 47.

In step 210, PLU assignment software 38 determines from the recorded choice whether to return to select another group, or to end.

For return, operation returns to step 172 to select another group.

Otherwise, operation ends at END 212.

Advantageously, PLU assignment software 38 assigns merchandise items to relative EPL numbers by automatically determining the EPL identification numbers. The operator does not need to know any EPL identification numbers in order to assign items to relative EPL numbers within groups.

Figure 10A:
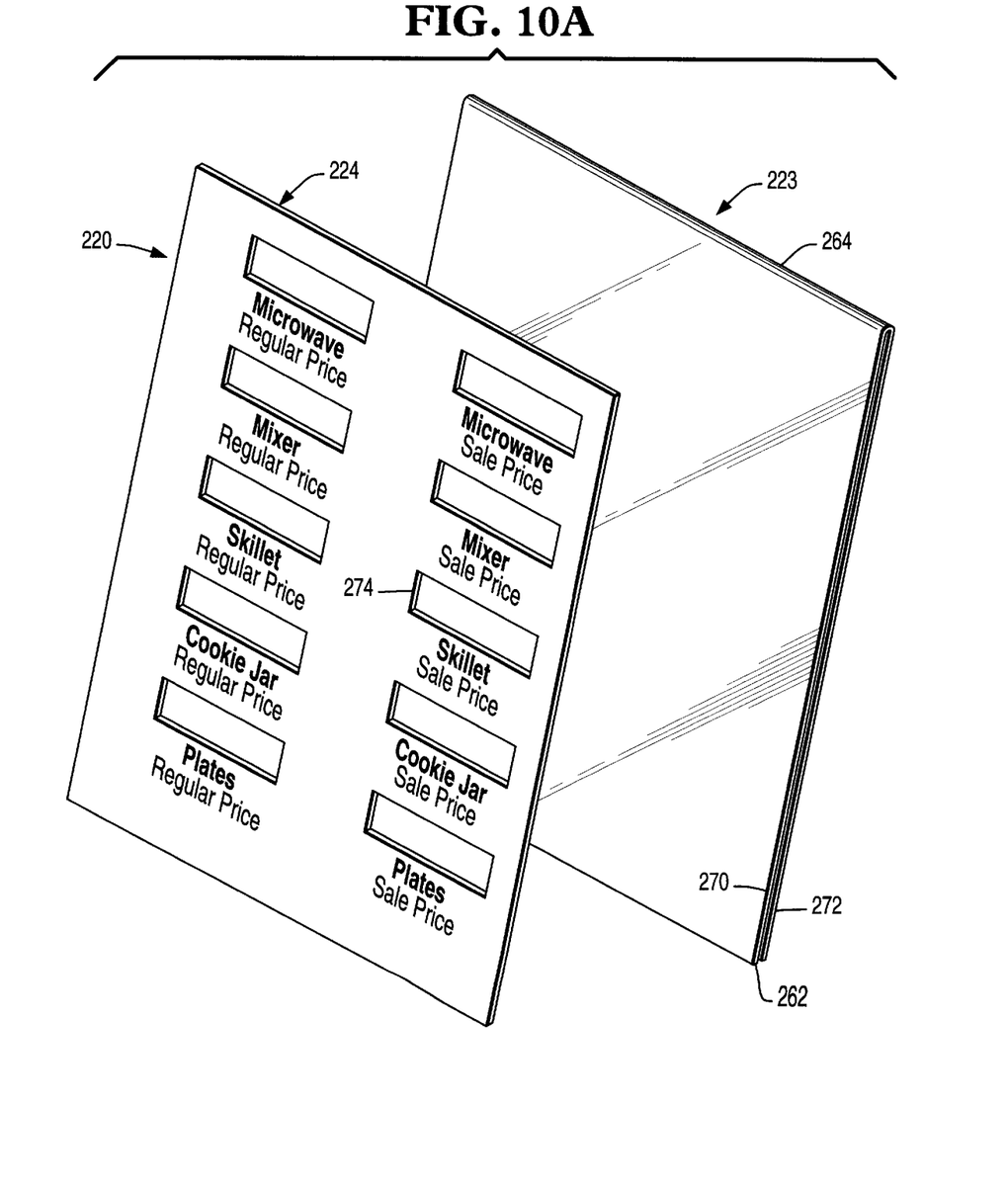
FIGS. 10A and 10B form an exploded view of a first sign incorporating a cassette.
Figure 10B:
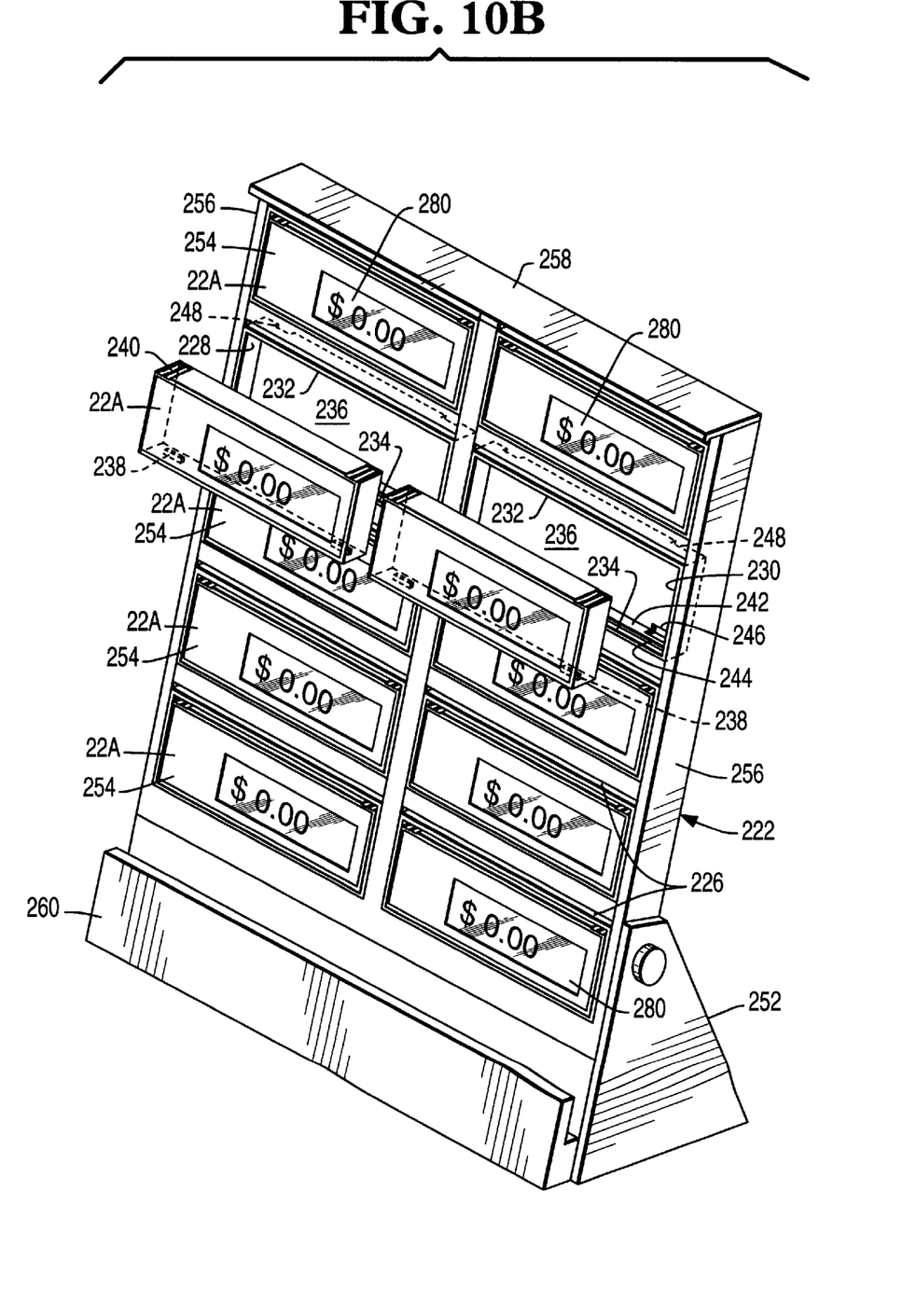

Turning now to FIGS. 10A and 10B, sign 220 includes EPL cassette 222, product description sheet holder 223, and product description sheet 224.

Cassette 222 includes rows and columns of bays 226 for installing EPLs 22A. Here, two columns and five rows of bays 226 are shown. However, the present invention envisions other numbers of rows and columns as well. Not all bays 226 need be filled with EPLs 22A. The number of EPLs 22A is determined by the product or products associated with sign 220 and the product description sheet 224. Cassette 222 is preferably made of plastic.

In more detail, each bay 226 includes left wall 228, right wall 230, top wall 232, bottom wall 234, and back wall 236.

Walls 228–234 are planar and form a frame for openings having substantially similar dimensions as the perimeters of EPLs 22A.

EPLs 22A include feet 238 and locking tabs 240 for retaining EPLs 22A within bays 226. EPLs 22A are inserted within bays 226 by inserting the bottom edge and feet 238 first, and the inserting the top edge and locking tabs 240 last. Removal is accomplished in reverse after using a key to depress locking tabs 240.

Bottom walls 234 include bottom support members 242 upon which EPLs 22A sit. Bottom support members 242 include end portions 244 which retain feet 238 in place within bays 226.

Back walls 236 include a include feet viewing apertures 246 and tab viewing apertures 248. Feet viewing apertures 246 allow an operator to access feet 238 and end portions 244. Tab viewing apertures 248 are located near the upper edges of back walls 236 and allow an operator to access locking tabs 240.

Each bay 226 is deep enough so that the front surfaces 254 of EPLs 22A are substantially flush with front surface 256 of cassette 222.

Cassette 222 may additionally include base 252 for supporting cassette 222 on a table or other flat surface. Here, base 252 is attached to cassette 222, however, base 252 may also be integrally manufactured with cassette 222. The disclosed cassette 222 with base 252 allows product description sheet 226 to be inclined, but other cassette orientations, including substantially vertical orientations, are also envisioned. Cassette 222 may also be manufactured without base 252 so that cassette 222 may be mounted on walls and other substantially vertical surfaces.

Cassette 222 additionally includes top and bottom retaining members 258 and 260 which retain product description sheet holder 223 against front surface 256 of cassette 222 and front surfaces 254 of EPLs 22A. Product description sheet holder 223 is inserted into cassette 222 by first placing bottom edge 262 behind bottom retaining member 260 and then pressing top edge 264 under top retaining member 258. Once in place, product description sheet holder 223 is held snugly in place by bottom retaining member 260 and top retaining member 258, but can be easily removed by applying a removal force to top edge 264 and top retaining member 258. Thus, reconfiguration with a different product description sheet 224 is easily accomplished.

Product description sheet holder 223 retains product description sheet 224. For this purpose, product description sheet holder 223 is generally U-shaped, having first and second panels 270 and 272. Panels 270 and 272 join at top edge 264. Product description sheet holder 223 is preferably made of transparent Plexiglas or plastic.

Product description sheet 224 slides between panels 270 and 272 of product description sheet holder 223. Product description sheet 224 includes item identification information, such as product name, brand, and style, and may additionally include other promotional information. Product description sheet 224 includes apertures 274 which line up with displays 280 of EPLs 22A when sign 220 is assembled with installed EPLs 22A.

Advantageously, sign 220 is particularly suited for promoting items that are not located on standard store shelving, such as end-aisle structures. Sign 220 may be mounted on a wall or placed on a table.

FIG. 10A illustrates a product description sheet 224 which includes promotional information for a special or "sale"  promotion for different items. For each line, one of EPLs 22A displays a regular price and the other EPL 22A displays a sale price.

Figure 11:
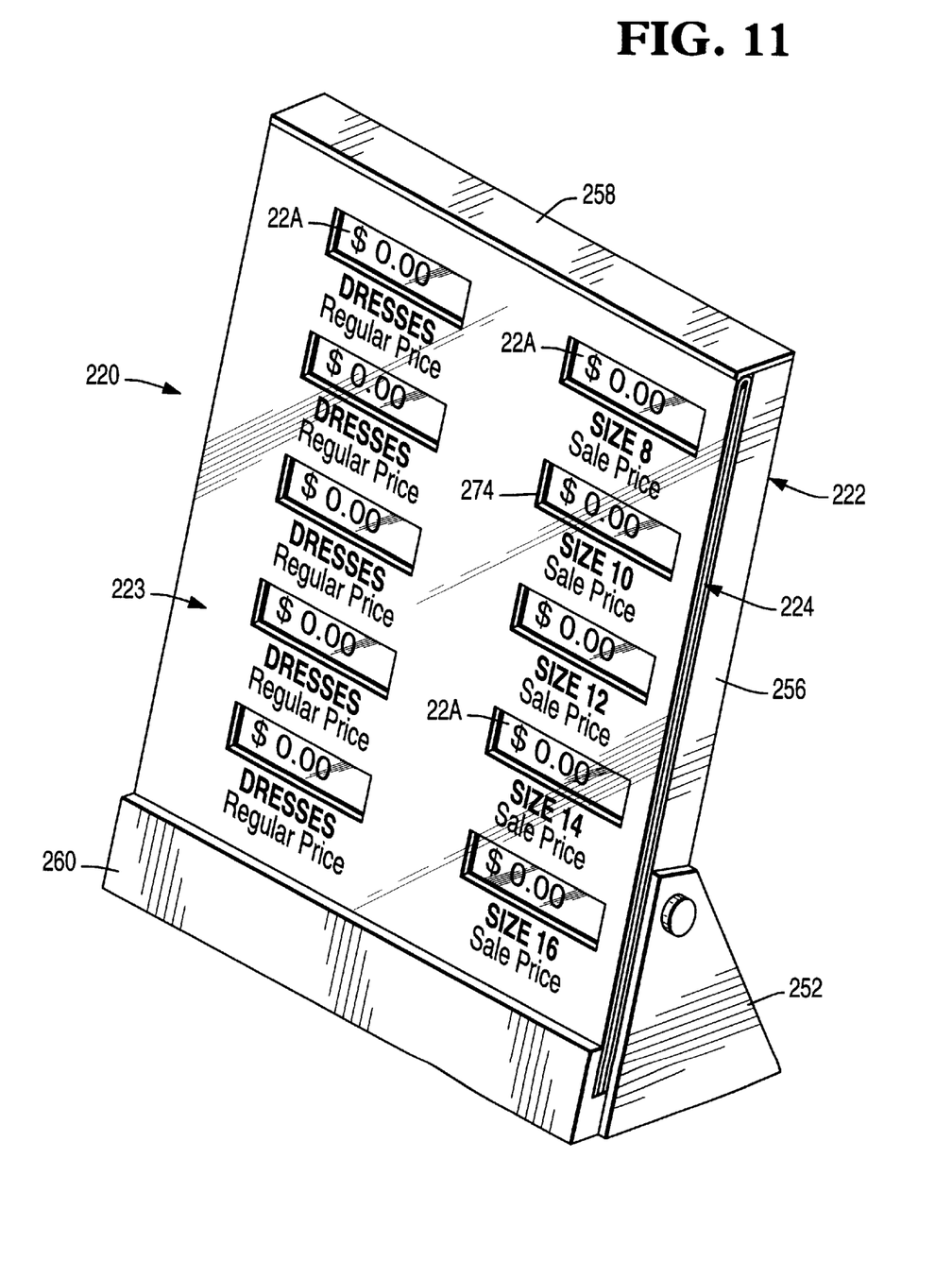
FIG. 11 is a second sign incorporating a cassette.

FIG. 11 illustrates a product description sheet 224 which includes promotional information for different styles or types of a single product. Each style has a corresponding EPL 22A for displaying the regular price of the style and the sale price of the style.

Although the present invention has been described with particular reference to certain preferred embodiments thereof, variations and modifications of the present invention can be effected within the spirit and scope of the following claims.

What is claimed is:

1. An electronic price label (EPL) system comprising:
   a plurality of EPLs arranged in rows and columns within a sign to define a group, wherein at least one of the rows includes a plurality of EPLs and wherein at least one of the columns includes a plurality of EPLs;
   a computer coupled to the EPLs which defines the group, which assigns the EPLs to the group, and which assigns item identification numbers and prices to the EPLs; and
   storage means coupled to the computer for storing group definition information, EPL assignments to the group, and item assignments to the EPLs.

2. The EPL system as recited in claim 1, wherein first item identification numbers are associated with different styles of a single product and assigned to EPLs within a single row.

3. The EPL system as recited in claim 1, wherein first item identification numbers are associated with different prices of a single product and assigned to EPLs within a single row.

4. The EPL system as recited in claim 1, wherein the storage means additionally stores prices associated with the EPLs.

5. The EPL system as recited in claim 1, wherein the item identification numbers are associated with different styles of a plurality of related products.

6. The EPL system as recited in claim 1, wherein the sign includes a cassette having a plurality of bays arranged in rows and columns.

7. The EPL system as recited in claim 6, wherein the sign includes a base for supporting the cassette on a surface.

8. The EPL system as recited in claim 1, wherein the sign is adapted for displaying a product description sheet which includes item identification information.

9. A method of displaying prices of related items comprising the steps of:
   (a) providing a plurality of electronic price labels (EPLs) for the items;
   (b) defining a group for the EPLs, including rows and columns;
   (c) assigning EPL identification numbers for the EPLs to the rows and columns; and
   (d) assigning item identification numbers associated with the items to the EPL identification numbers.

10. The method as recited in claim 9, wherein step d comprises the substeps of:
   (d-1) assigning a first item identification number to a first EPL identification number in a first row, wherein the first item identification number is associated with a first price; and
   (d-2) assigning a second item identification number to a second EPL identification number in the first row, wherein the second item identification number is associated with a second price.

11. The method as recited in claim 9, wherein step d further comprises the substeps of:
   (d-1) assigning a first item to a first row;
   (d-2) assigning a first item identification number to a first EPL identification number in the first row, wherein the first item identification number is associated with a first price of the first item; and
   (d-3) assigning a second item identification number to a second EPL identification number in the first row, wherein the second item identification number is associated with a second price of the first item.

12. The method as recited in claim 9, wherein step d comprises the substeps of:
   (d-1) assigning a first item to a first row;
   (d-2) assigning a first item identification number to a first EPL identification number in the first row, wherein the first item identification number is associated with a regular price; and
   (d-3) assigning a second item identification number to a second EPL identification number in the first row, wherein the second item identification number is associated with a special price.

13. A method of displaying prices of related items comprising the steps of:
   (a) providing a plurality of electronic price labels (EPLs) for the items;
   (b) defining a group for the EPLs, including rows and columns;
   (c) assigning EPL identification numbers for the EPLs to the rows and columns;
   (d) assigning numbers of prices to item identification numbers associated with the items;
   (e) assigning the item identification numbers to the EPL identification numbers; and
   (f) assigning predetermined prices within the numbers of prices to the EPL identification numbers.

14. The method as recited in claim 13, wherein step f comprises the substep of:
   (f-1) storing price identifiers associated with the numbers of prices in records containing the EPL identification numbers and the item identification numbers.

15. The method as recited in claim 13, wherein step f comprises the substep of:
   (f-1) storing price identifiers associated with the numbers of prices in the item identification numbers.

16. The method as recited in claim 13 further comprising the step of:
   (g) storing group definition information in a group definition file.

17. The method as recited in claim 16 further comprising the step of:
   (h) displaying the predetermined prices associated with the items by the plurality of EPLs.

* * * * *